United States Patent [19]

Jones et al.

[11] Patent Number: 5,023,041
[45] Date of Patent: Jun. 11, 1991

[54] METHOD FOR MAKING A FIBER REINFORCED COMPOSITE ARTICLE

[75] Inventors: Jackie D. Jones; Guy C. Murphy, both of Fairfield; Thomas C. Mesing, Mainville; Barrett J. Fuhrmann, Cincinnati, all of Ohio

[73] Assignee: General Electric Company, Cincinnati, Ohio

[21] Appl. No.: 504,072

[22] Filed: Mar. 12, 1990

Related U.S. Application Data

[63] Continuation of Ser. No. 333,877, Apr. 4, 1989, abandoned, which is a continuation of Ser. No. 131,473, Dec. 10, 1987, abandoned.

[51] Int. Cl.$^5$ .................. B29C 43/18; B29C 45/02; B29C 45/16
[52] U.S. Cl. ................... 264/510; 264/258; 264/328.4; 264/328.7; 164/80; 164/97
[58] Field of Search ............ 264/102, 241, 257, 258, 264/294, 297.4, 328.4, 328.7, 510; 164/80, 97

[56] References Cited

U.S. PATENT DOCUMENTS

| | | | |
|---|---|---|---|
| 2,478,013 | 8/1949 | Roddy | 264/328.1 |
| 2,841,823 | 7/1958 | Hartesveldt | 425/446 |
| 3,649,425 | 3/1972 | Alexander | 156/213 |
| 3,892,612 | 7/1975 | Carlson | 156/150 |
| 4,256,689 | 3/1981 | Gardner | 425/558 |
| 4,455,268 | 6/1984 | Hinrichs | 264/40.6 |
| 4,480,981 | 11/1984 | Togawa | 264/40.6 |
| 4,540,534 | 9/1985 | Grendol | 264/328.7 |
| 4,618,466 | 10/1986 | McGlashen | 264/328.7 |
| 4,659,071 | 4/1987 | Woltron | 264/258 |
| 4,707,317 | 11/1987 | Epel | 264/258 |
| 4,759,893 | 7/1988 | Krauter | 204/258 |
| 4,810,444 | 3/1989 | Alberino | 264/102 |

OTHER PUBLICATIONS

Structural Parts From Epoxy Rim Using Preplaced Reinforcement; Farris et al; 37th Annual Conference, Reinforced Plastics/Composites Institute, Jan. 11–15, 1982.

*Primary Examiner*—Jay H. Woo
*Assistant Examiner*—Jeremiah F. Durkin
*Attorney, Agent, or Firm*—Jerome C. Squillaro; Carmen Santa Maria

[57] ABSTRACT

A method for making a fiber reinforced composite article includes placing in a forming mold article cavity a preform which includes at least a fiber reinforcement arrangement, such as stacked piles of resin bonded sheets. Closure of the mold defines a matrix reservoir for excess matrix material in fluid flow relationship with the article cavity. Gas pressure applied to the excess matrix material while in the fluid condition forces that material back into the article cavity to nominally eliminate voids, pores and other internal and surface discontinuities from the article.

3 Claims, 2 Drawing Sheets

METHOD FOR MAKING A FIBER REINFORCED COMPOSITE ARTICLE

This is a continuation of application Ser. No. 07/333,877, filed Apr. 4, 1989 now abandoned which is a continuation of application Ser. No. 131,473 filed Dec. 10, 1987, now abandoned.

This invention relates to the manufacture of a fiber reinforced composite article and, more particularly, to use of high pressure gas densification with a matrix at relatively low viscosity.

BACKGROUND OF THE INVENTION

Because of its high strength to weight ratio, fiber reinforced composite structures have become attractive for aerospace applications, such as parts for airframes and propulsion power plants. Molding of such parts has been relatively time consuming and labor intensive because of the need to position elements accurately in the mold and to process slowly to avoid porosity and other internal and surface defects during polymerization, cross linking or hardening/gelling of the matrix material.

During initial curing cycles in such known processes, there must be a careful balance between applied temperature and pressure: viscosity and flow of the matrix can affect the positioning and unwanted movement of the particularly placed reinforcing fibers or cloth. For example, too high a processing temperature will cause reduced gelation time and rapid increase in resin viscosity which together with fast closure of the mold will result in the fiber reinforced plies to be displaced from their preselected position and orientation. Conventional compression molding of laminated composite articles requires a strictly controlled temperature and pressure application to achieve void free moldings. The process has to be accurately controlled relative to the rheological behavior of the resin matrix. The mold has to be closed relatively rapidly initially to expel surplus resin during its low viscosity phase which allows the resin to flow without disturbing the fibers. As the resin viscosity increases the mold closure rate is slowed down aiming at closing the mold just prior to the resin gelation point. Closing too prematurely results in purging too much resin out of the laminated article resulting in porosity. Closing the mold too late results in incomplete consolidation which also creates porosity. All the critical processing parameters, associated with conventional compression molding, of mold temperature, mold closure rate, pressure application and resin rheological behavior have resulted in expensive computer controlled apparatus and methods. These attempt to achieve the sophisticated process parameters necessary to produce high quality, void-free composite articles. One such system is reported in U.S. Pat. No. 4,455,268-Hindricks et al, issued Jun. 19, 1984, the disclosure of which is hereby incorporated herein by reference. Some of the problems associated with the flow characteristics of resins as a function of temperature and viscosity are discussed in that incorporated patent.

SUMMARY OF THE INVENTION

It is a principal object of the present invention to provide an improved, simplified and less costly method for more rapidly making a fiber reinforced composite article while avoiding internal and surface imperfections and discontinuities in the article.

Another object is to provide apparatus for conducting such a method.

These and other objects and advantages of the present invention will be more fully understood from the following detailed, representative description, examples and drawings which are intended to be typical of, rather than in any way limiting on, the present invention.

Briefly, the present invention, in one form, provides a method for making a fiber reinforced composite article, comprising first placing a preform including at least a fiber reinforcement array in a forming mold cavity after which the mold is closed to define an article cavity of desirable shape about the preform. The mold preferably is preheated. In any event, the preform is heated, and a fluid matrix material flows about the fibers, about the article cavity, and is expelled from the article cavity into a matrix or resin reservoir connected in fluid flow relationship with article cavity. While the matrix material is fluid, the reservoir is gas pressurized so as to press the fluid matrix material from the reservoir back into the article cavity, to more completely fill voids in the cavity, to compress gas/air entrapped in the preform, to expell such entrapped gas/air through an exit port (in one form of the invention), or a combination of such events. The article thus being produced is held in such a pressurized condition at a selected temperature until the matrix material is sufficiently solidified (for example, polymerized) about the fibers to maintain the shape integrity of the articles being formed. Then such member is removed from the mold for further processing into the completed article.

In the apparatus form of the present invention, a mold system includes a matrix material reservoir connected in fluid flow relationship with the article cavity and adapted to hold excess matrix material, such as resin, expelled from the article cavity. The apparatus also includes means to gas pressurize the reservoir so as to press the matrix material into the article cavity.

DESCRIPTION OF THE PREFERRED EMBODIMENTS

Figure 1:
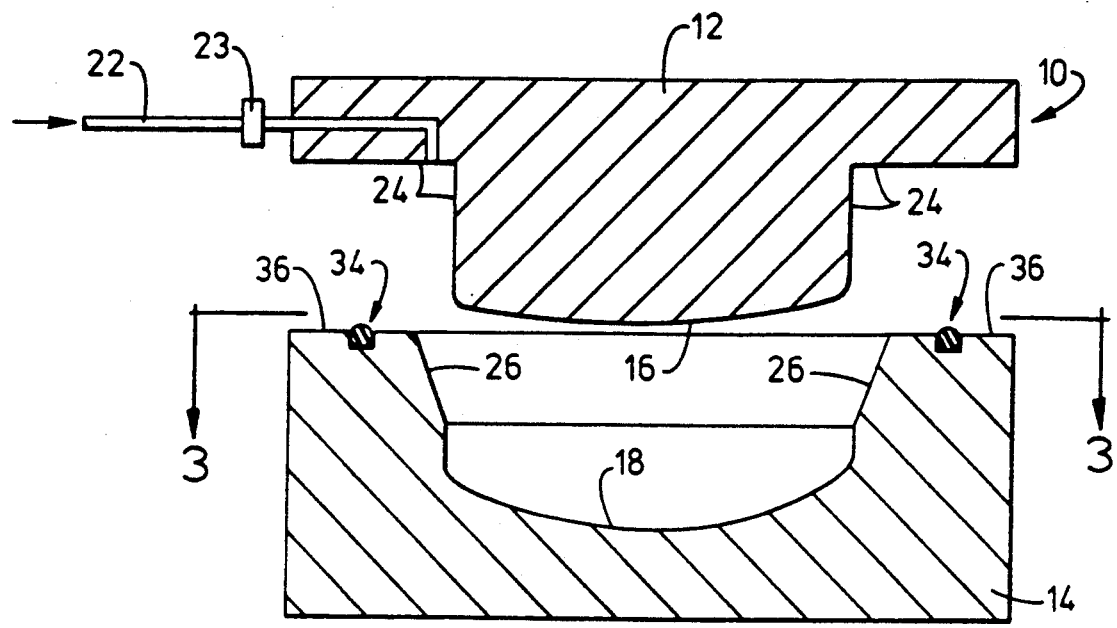
FIG. 1 is a diagrammatic, sectional view of a mold including a pair of mold portions, an upper and a lower, in open relationship.
Figure 2:
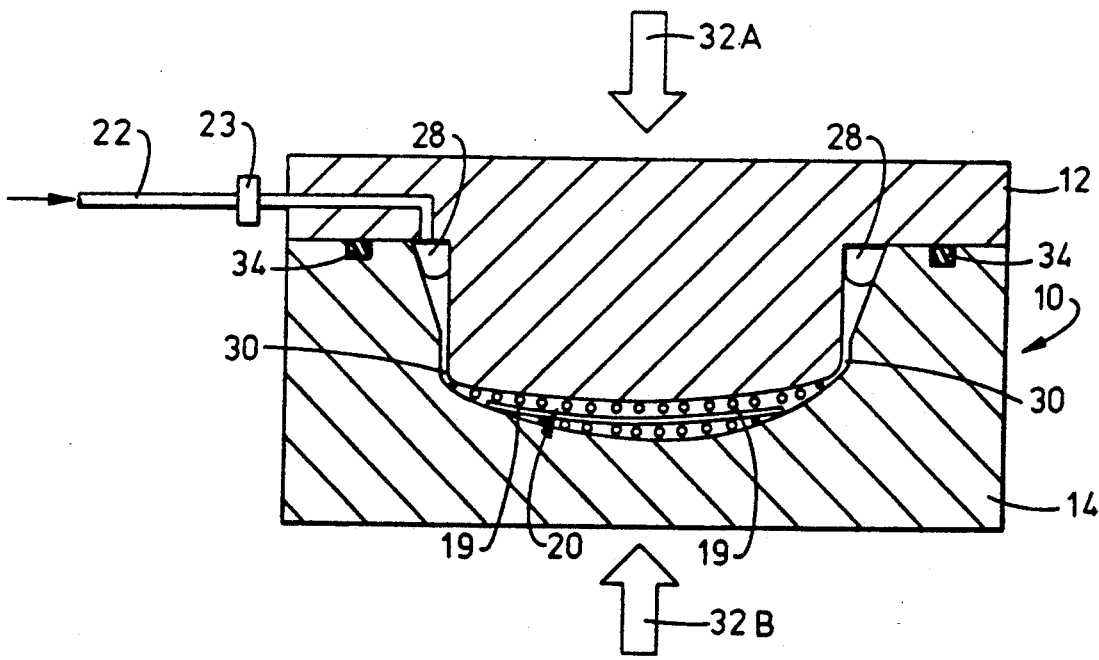
FIG. 2 is a diagrammatic, sectional view of the mold of FIG. 1 in closed position with a preform within the mold.

The diagrammatic, sectional views of FIGS. 1 and 2 depict a mold shown generally at 10 having an upper mold portion 12 and a lower mold portion 14. Conveniently, such mold portions generally are heated by conventional press platens or by the inclusion of resistance heaters or by circulating heat transfer fluids within chambers in the mold (not shown), as is well known and widely used in the art.

The upper and lower mold portions include shaped internal surfaces 16 and 18, respectively, which together define an article cavity 20 in FIG. 2.

Upper mold portion 12 includes means to pass therethrough a pressurized gas, for example, air, argon, nitrogen, etc., from a source (not shown) such as through a conduit 22. Gas flow through conduit 22 is controlled by a valve and control 23 as well known in the art, for example based on applied force limits sensed between upper and lower mold portions upon closure. The gas source, for example, can be a tank of pressurized gas connected to an external end of conduit 22 for such purpose. Upper mold portion 12 includes a wall or walls 24 in FIG. 1 through which conduit 22 is open in the embodiment of FIGS. 1 and 2. Wall 24, which is contiguous with internal surface 16, cooperates with a wall 26 of lower mold portion 14 to define a matrix reservoir 28, as shown in FIG. 2, when the upper and lower mold portions are in the closed position as shown in that FIG. 2. Wall 26 is contiguous with internal surface 18 of the lower mold portion. The upper and lower mold portions are designed and constructed to provide internal clearance between internal walls and surfaces of the upper and lower mold portions in the closed position. This provides a fluid flow path 30, for example about 0.005 inch tool clearance, generally circumferentially disposed about article cavity 20, enabling fluid flow communication between reservoir 28 and article cavity 20 when the mold portions are brought into registry. For example, such registry can be brought about through the application of mechanical force or clamping pressure represented by arrows 32A and 32B, FIG. 2. One of the mold portions in this embodiment, lower mold portion 14, is provided with a gas seal, shown generally at 34, about the periphery of its surface 36, and shown in FIGS. 1 and 2 as a rubber "O" ring in a groove. A typical arrangement for such a seal in lower mold portion 14 is shown in FIG. 3 which is a diagrammatic top view of the lower mold portion 14 viewed along line 3—3 of FIG. 1.

Figure 3:
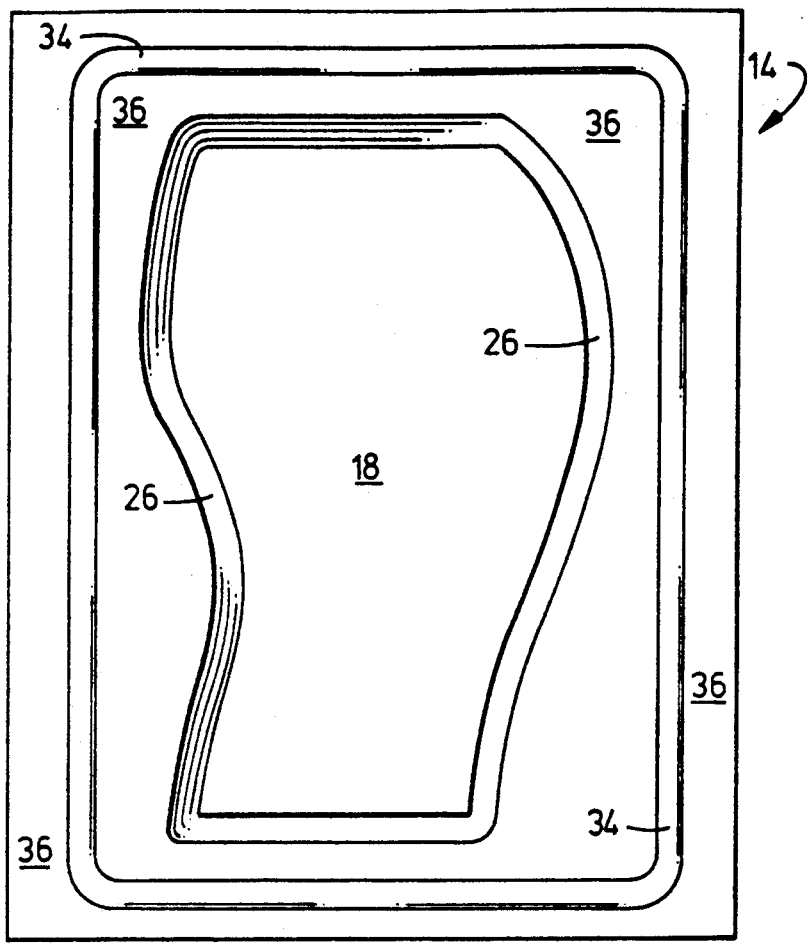
FIG. 3 is a top view of the lower mold of FIG. 1 viewed along line 3—3 of FIG. 1.

In the conduct of the method of the present invention utilizing the apparatus embodiment of FIGS. 1, 2 and 3, a fiber preform is prepared consistent with the shape of article cavity 20. Typically, a plurality of precut sheets of a fiber bonded structure, for example using a resin such as epoxy, bonded with fibers, such as graphite, glass, boron, etc. are stacked to approximate the shape of an article to be produced. Methods and apparatus for such a preparation are described widely in the art. For example, U.S. Pat. Nos. 3,649,425-Alexander (issued Mar. 14, 1972) is typical of a composite metal matrix fiber reinforced bonded arrangement, and 3,892,612-Carlson, et al. (issued Jul. 1, 1975) and 4,271,116-Jones (issued Jun. 2, 1981) are typical of composite fiber reinforced bonded structures and methods in which resin is, at least in part, the matrix. The prior art patents, describe cutting and stacking of appropriately shaped plies in the manufacture of a shaped article such as a blade for a gas turbine engine. The disclosures of each of the above identified patents are hereby incorporated herein by reference.

As is known and used in the art, in order to prepare, initially, each ply for stacking prior to placement of the assembled stack in the forming mold such as 10 in FIGS. 1 and 2, each ply generally is more accurately trimmed in a cutting press. Then the plies are stacked in a preselected order and arrangement, and such a preform is placed and aligned in lower mold portion 14 on internal surface 18 as indicated at 19 in FIG. 2. Conveniently, lower mold portion 14 as well as upper mold portion 12 are preheated to a desired processing temperature, as will be discussed in more detail later herein in connection with the present invention. Then the mold is closed on preform 19 as by bringing the upper and lower mold portions into registry as shown in FIG. 2 and holding them together by a force such as shown by arrows 32A and 32B, one of which can be a reaction force. The application of heat and pressure forms and bonds together the plies of the preform to provide a consolidated article shape.

The prior art conventional compression molding of preimpregnated composite materials has involved very accurate mold temperature control and precise closing of the mold based on the rheological behavior (viscosity/gelation times) of the particular resin matrix batch. Highly expensive computer controlled press and molding apparatus is required to achieve sophisticated process parameters necessary to attempt to produce high quality, void-free composite articles. For example, one such arrangement is shown in the above incorporated U.S. Pat. No. 4,455,268-Hindricks et al, issued Jun. 19, 1984. The mold closure cycles are comparatively long to be able to close the mold slowly during the resin's highly viscous phase without disturbing the fibers of the reinforcement. Another system for controlling a resin process is shown in U.S. Pat. No. 4,480,981-Togawa et al, issued Nov. 6, 1984, the disclosure of which is hereby incorporated herein by reference.

As an example of a prior molding process utilizing a commercially available resin marketed as Ferro CE 9220 epoxy resin, a temperature of 240° F. was established based on a 30 minute mold closure cycle which initially allows first fairly rapid approach to closure and rapid expulsion of the excess resin during the resin's low viscosity stage without disturbing the fiber/ply array and then slowly fully closing during the resin's higher viscosity phase to produce nominally void free articles. In such a cycle there is a critical relationship between resin gelation time (related to viscosity) and mold closure. The critical processing window with that resin between rapid and slow closure was demonstrated to span about 8 minutes at the molding temperature of about 240° F. An increase in molding temperature, resulting in a more rapid gelation of the resin, increases the criticality of the window, for example to a span of about 40 seconds at 300° F. Yet a higher molding temperature in combination with a more rapid mold closure could significantly increase production and reduce production costs which can be labor intensive.

The method of the present invention provides such an improvement without causing fibers or plies to be washed or wrinkled especially as the resin viscosity increases. According to the present invention, the mold portions, which are heated at a higher than normal processing temperature, for example in the range of about 280°-350° F. using the CE 9220 epoxy resin, are closed rapidly into full registry as shown in FIG. 2. In one example a loading force of up to about 330,000 pounds was used. For example, such closure can be accomplished in the range of about 7-12 minutes at those temperatures rather than the previous about 30 minutes required for a nominally void free article. In the method of the present invention, in order to avoid the formation of voids, pores and other discontinuities in the molded article, promptly upon closure or registry of the mold portions, while the resin is in its low viscosity phase and well prior to extensive resin gelation, a gaseous back pressure, for example in the range of about 200-300 psi and typically 240 psi, was applied to excess resin (or matrix) expelled into an adjoining reservoir, such as 28 in FIG. 2. Such back pressure forces or presses the excess resin back into the article cavity and about preform 19 thereby to fill voids, and discontinuities and to compress any air or other gas bubbles entrapped within the matrix. The higher processing temperature and the resultant lower resin viscosity avoids washing or other undesirable movement of the reinforcing fibers or wrinkling of the plies, associated with such rapid mold closure or high processing temperatures, or their combinations. In a specific example utilizing the CE 9220 resin system at a 275° F. mold/processing temperature and such rapid mold closure followed by prompt gaseous back pressure at 240 psi, molded articles were removed from the mold after as little as 45 minutes compared to the conventional process at 240° F. temperature requiring about 1.5-2 hours of mold exposure. The present invention has overcome the practical infeasibility of prior processing at higher temperatures based on the very narrow processing windows at such temperatures associated with resin gelation.

After the rapid processing according to the method of the present invention, the mold portions are separated and the molded article is withdrawn. Thereafter, such article can be post cured, for example, such as placing in an oven in the range of about 275°-350° F. for about 1-12 hours, depending on the oven temperature, to further polymerize the resin matrix of the article. Then flash removal, trimming and benching can be conducted, as necessary and well known in the art.

Figure 4:
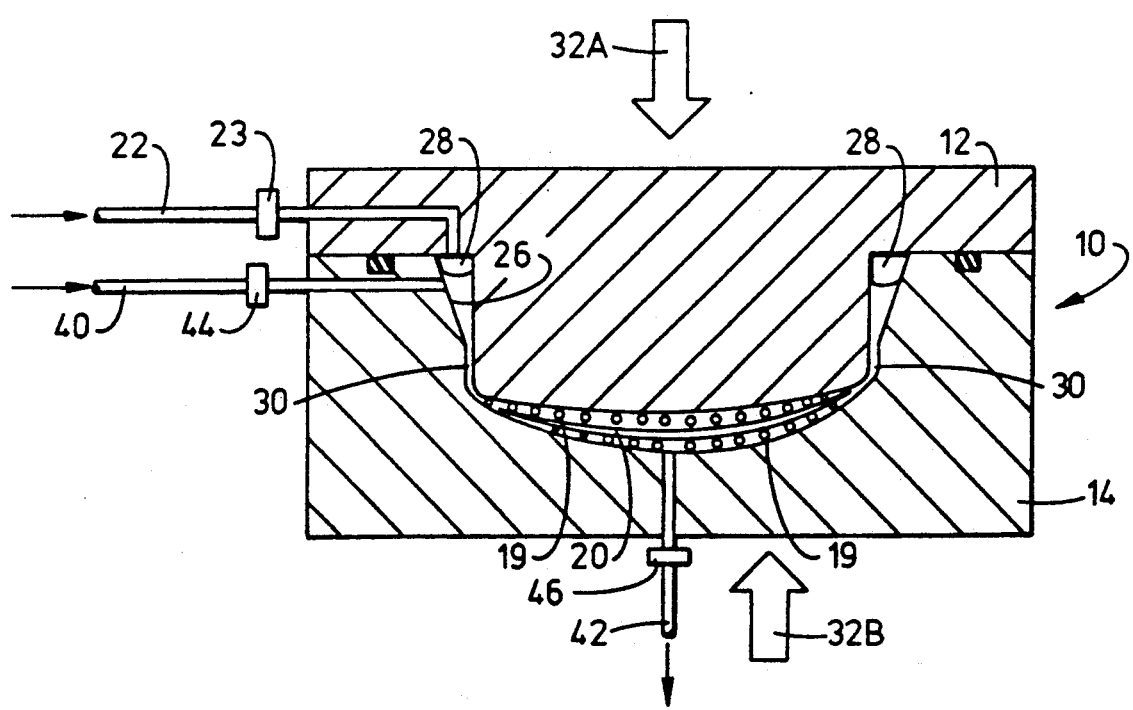
FIG. 4 is a diagrammatic, sectional view of another form of the apparatus of the present invention.

Another form of the apparatus of the present invention is shown in the diagrammatic, sectional view of FIG. 4 in which like reference numbers to those of FIGS. 1 and 2 are used. In this embodiment, mold 10 includes, in addition to the elements described in connection with FIGS. 1 and 2, a resin injection conduit 40 open at one end into reservoir 28 formed by walls 24 and 26 respectively of upper and lower mold portions 12 and 14. In the embodiment of FIG. 4, conduit 40 is open through wall 26 for convenience. However, it will be recognized by those skilled in the art that conduit 40, like conduit 22, can be located in either or the same mold portion so long as they provide their respective functions in respect to reservoir 28; conduit 22 to gas pressurize the resin in the reservoir toward fluid flow path 30 and conduit 40 to inject resin into the reservoir, as appropriate to the specific process used. In addition, a discharge conduit 42, shown in FIG. 4 to be located for convenience through lower mold portion 14, connects article cavity 20 to the outside of the mold. Flow through resin injection conduit 40 and discharge conduit 42 can be controlled and coordinated through their respective valves 44 and 46. As is well known, for example as included in some of the above incorporated patents, a central process control, using state of the art sensors, timers, etc., can be used to control the various movements and functions of the apparatus of the drawings, including valves 23, 44 and 46, movement of upper and lower mold portions 12 and 14, application and reduction of forces 32A and 32B, etc.

Conduit 40 can be part of the pressurized resin injection molding system, sometimes referred to in the art as Resin Transfer Molding or RTM. In one form of such a system, resin in a closed container is pressurized by air to transfer the resin from the container through a conduit, such as 40 in FIG. 4, into a vented mold cavity. Prior to injection, an array of dry fibers or fabric is placed in the mold article cavity as a preform 19 and then the injected resin is moved about and through the fibers while the resin is at low viscosity. The present invention can be used in conjunction with such a RTM system, for example in the embodiment of FIG. 4. In that form of the present invention, resin is injected through conduit 40, when the upper and lower mold portions are closed, into reservoir 28, through fluid flow path 30 and into article cavity 20 about a fiber network or preform 19 disposed therein. Then with excess resin in reservoir 28, application of gas pressure through conduit 22 forces excess resin to flow back into article cavity 20, as described above, and further to sweep entrapped air/gas bubbles in the article cavity out through discharge conduit 42 along with some excess resin. In this way, an article nominally free of voids, pores or other discontinuities or imperfections is produced in a more rapid, efficient and lower cost method.

The above embodiments have been described in connection with the use of resin, for example epoxy, as the matrix. However, other matrix materials, for example metals, for example aluminum or its alloys, or ceramics, for example QF180 Fiberfrax material with an appropriate ceramic binder, can be used through appropriate adjustment of process parameters and materials of apparatus construction. As was mentioned above, a wide variety of fibers and fabrics, commonly used in the art, for example in the dry or partially bonded condition, can be used with the matrix material selected for the intended article use. Although the present invention has been described through the detailed embodiments, those skilled in the art will readily recognize the variety of other forms within the scope of the appended claims.

What is claimed is:

1. In the method for making a fiber reinforced composite article, including placing within a mold, a plurality of plies stacked in preselected order to make a preform, each ply having fibers embedded in a heat flowable matrix material; and closing the mold portions to define an article cavity about the preform; the subsequent steps of:

at the pressure existing in the article cavity about the preform upon closing the mold, heating the preform to a temperature selected to fluidize the matrix material in the preform and to flow the matrix material within and about the article cavity and the preform fibers, while maintaining the article cavity, to generally fill the article cavity, and to flow excess fluid preform matrix material from within the article cavity outside of the article cavity and in fluid flow relationship with the article cavity;

while maintaining the matrix material fluid through heating, applying a gas back pressure to the excess fluid matrix material to force the excess fluid matrix material back into the article cavity and thereby to pressurize the article cavity through the excess fluid matrix material; and then, maintaining the gas pressure to pressurize the article cavity while solidifying the matrix material.

2. In the method of claim 1 for making a resin bonded fiber reinforced composite article, in which:

the heat flowable matrix material is a polymerizable resin which is heat flowable at least prior to resin polymerization;

the temperature for heating the resin is sufficient to fluidize resin from the preform, prior to resin polymerization, within and about the article cavity and to expel excess resin into a resin reservoir maintained in fluid flow relationship with the article cavity; and the gas pressure is maintained until the resin has polymerized sufficiently to remove the article from the mold cavity.

3. In the method of claim 1 for making a metal bonded fiber reinforced composite article, in which:
the heat flowable matrix material is a metal;
the temperature for heating the metal is sufficient to melt the metal and enable flow of the metal from the preform within and about the article cavity, and to expel excess melted metal into a metal reservoir in fluid flow relationship with the article cavity; and
the gas pressure is maintained on the article cavity through the melted metal in the metal reservoir, while reducing the heating, until the melted metal has solidified sufficiently to remove the article from the article cavity.

* * * * *